C. W. LARNER.
LOAD SUSTAINING DEVICE FOR VERTICAL WATER WHEELS.
APPLICATION FILED AUG. 5, 1912.
1,171,857.
Patented Feb. 15, 1916.
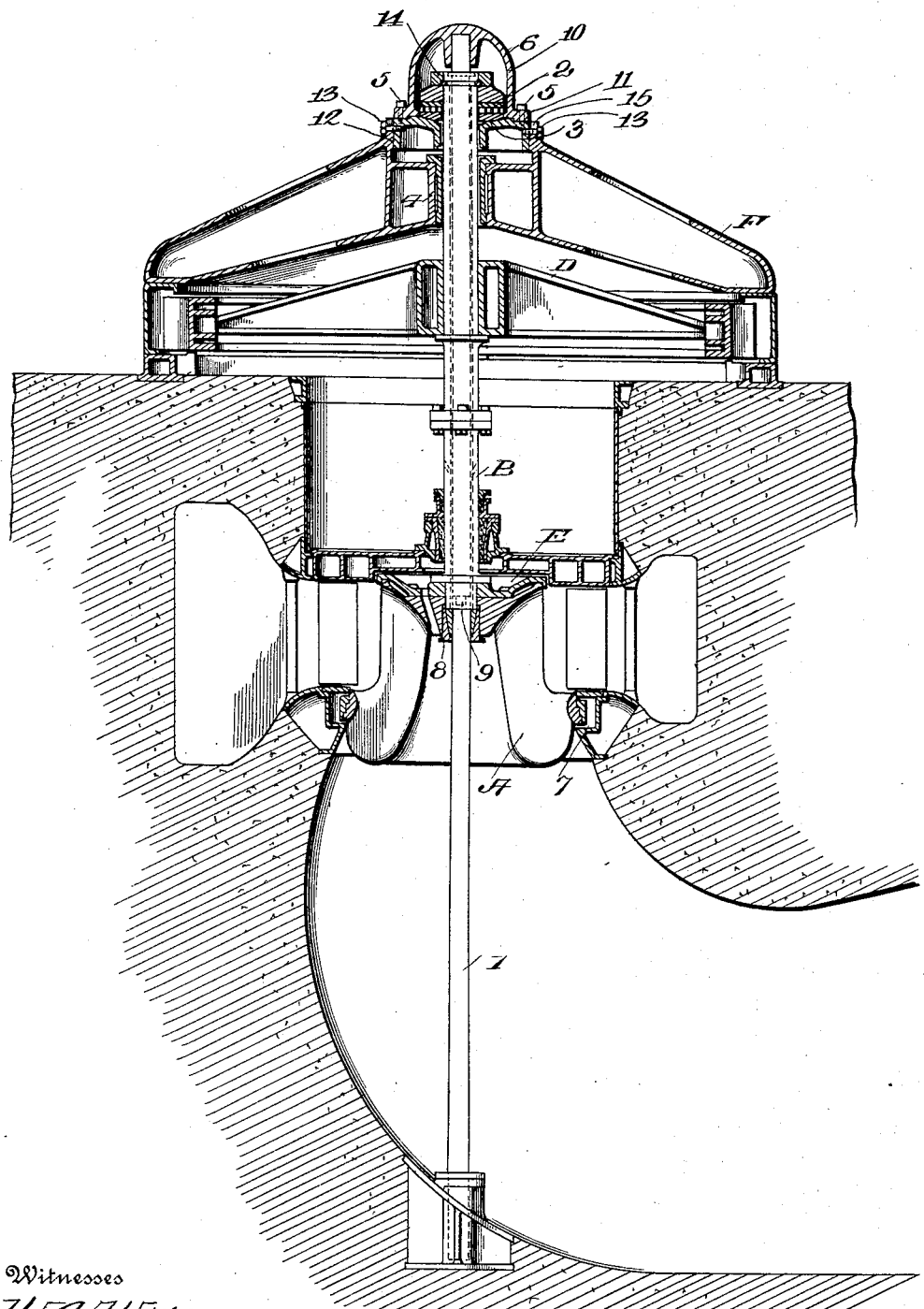

UNITED STATES PATENT OFFICE.

CHESTER W. LARNER, OF CLEVELAND, OHIO.

LOAD-SUSTAINING DEVICE FOR VERTICAL WATER-WHEELS.

1,171,857.   Specification of Letters Patent.   Patented Feb. 15, 1916.

Application filed August 5, 1912. Serial No. 713,318.

*To all whom it may concern:*

Be it known that I, CHESTER W. LARNER, a citizen of the United States, and a resident of Cleveland, in the county of Cuyahoga and State of Ohio, have invented a new and useful Load-Sustaining Device for Vertical Water-Wheels, of which the following is a specification.

Heretofore and before my invention it has been the practice in water wheel installations of the vertical type to have the spider on top of the generator carry the roller bearing and the weight of all the parts which hang on it. In the case of a large unit this weight is very considerable, and as the diameter of the generator frame is also large, the design of the spider becomes quite a problem, inasmuch as it is necessary when using a roller bearing to reduce the deflection of the support under it to a negligible quantity. For example, let us assume an installation where the outside diameter of the generator frame is forty-five feet and the weight on the roller bearing over 1,000,000 pounds. Under these conditions a cast steel spider weighing about 450,000 pounds shows a deflection of about ⅛″ as closely as it can be calculated. This deflection is prohibitive and yet it is doubtful if a spider could be made which would materially reduce it inasmuch as any increase in the weight of the spider adds of itself to the deflection at the center.

My present invention therefore contemplates and resides in means independent of the spider for centrally supporting the weight of the revolving elements of both turbine and generator.

For a comprehensive understanding of the invention reference is to be had to the annexed drawing, which is a vertical sectional view of an actual installation.

The elements to be supported are the water wheel runner A, the shaft B, and the rotor of the generator D. In addition to this load, I also have the hydraulic thrust due to the vacuum on the bottom of the runner and the pressure in the space E, above the runner. As previously remarked, the spider F, above the generator, cannot in the case of large installations sustain the load without serious deflection. I therefore provide a stationary support or column 1, extending up through the hollow shaft B, which latter is accommodated by the bore of the spider F, so that the latter acts as a radial support or brace for the shaft and column. Surmounting the column there is a shell, dome, or housing 6, having a depending wall or skirt 10, provided with a flange 11, which is secured as at 5 to a bottom plate or ring 3. The latter fits the bore 12 of the spider to which it is secured by bolts 13, which pass through open slots 15. There is a roller path 2 within the dome or housing and the shaft is supported thereon by means of a collar or abutment 14. Since the support 3, is connected with and really forms the bottom of the dome or housing 6, which is carried by the column, it follows that the weight or thrust of the shaft and its running parts cannot be thrown upon the spider. Consequently the latter acts simply as a radial brace or support and as a guide bearing. This makes it possible to use a very light spider since it is here required only for the purpose of carrying the guide bearing 4, at the top of the generator shaft and to steady the shaft against vibration. The fastenings 5, are bolts about three inches in diameter, and in practice they are usually ten or more in number.

If for any reason it is desired to remove the thrust bearing, this may be accomplished by lowering the plate 3, after backing out the retaining bolts. This permits the shaft to drop until the runner A rests upon the shoulder 7 of the lower foundation ring. The entire weight of the revolving elements is then supported on the shoulder 7, and none of it comes upon the spider. The cap 6, can then be removed from the top of the stationary column, and the thrust bearing taken out. When re-assembling the bearing, the weight of the revolving parts is transferred back to the column by tightening up on the bolts in the flange of the cap 6. The value and advantage of a device which will support at the center, without depending on a spider, the enormous load present in installations of this kind, will be manifest to those skilled in this branch of engineering.

The column of which the drawing is an illustration is an eighteen inch solid steel forging, and despite its length is amply sufficient to carry the required weight with a large factor of safety. On account of the great length of the supporting column, it becomes necessary to have a bearing at or near its center, and, I have shown for illustrative purposes a lignum vitæ bearing 8, inserted in the hub of the runner, and the column in sections coupled as at 9. Any suitable provision may be made for lubricating purposes; for example water may be admitted through the hollow shaft.

It will be obvious to those skilled in the art to which the invention relates that various changes and modifications may be made without departing from the spirit and scope of the invention.

I claim as new and desire to secure by Letters Patent, the following:

1. The combination of a vertical support or column, a shaft revoluble and having a limited endwise movement thereon, a generator rotor and a runner secured to the shaft, a spider constituting a guide bearing for the shaft, a shell surmounting the column and having a depending wall or skirt fitted with a bottom plate or closure that is accommodated in the bore of the spider, a roller path supported upon said bottom plate and upon which is borne the shaft and its load, and a foundation ring in proximity with the runner, the arrangement being such that the load may be shifted to said foundation ring without transferring any part of it to the guide bearing.

2. In a structure of the type recited, the combination of a revoluble hollow shaft, a generator rotor and a runner carried thereby, a spider which constitutes a guide bearing for the shaft, a fixed support or column telescoping the shaft, and a member surmounting the column and including a roller path which supports the weight of the shaft and its complemental parts.

3. In a structure of the type recited, the combination of a fixed vertical support, a shaft revoluble thereon, a generator rotor and runner carried thereby, a spider constituting a radial brace and guide bearing for the shaft, a shell or housing swung from the top of the vertical support, and a roller path carried by said shell and adapted to sustain the weight and thrust of the shaft and the elements connected therewith.

4. In a structure of the type recited, the combination of a revoluble hollow shaft, a generator rotor and a runner carried by the shaft, a spider which constitutes a guide bearing for the shaft, a fixed vertical support or column telescoping the shaft and carrying at its upper end a roller path on which the shaft is hung, means whereby the shaft may be lowered to permit of access to the roller path, and a foundation ring in the region of the runner and on which the latter rests when the shaft is lowered so that no weight is transferred to the spider.

In testimony whereof I have hereunto signed my name in the presence of two subscribing witnesses.

CHESTER W. LARNER.

Witnesses:
C. D. GILPIN,
PAUL H. DOUGLAS.

Copies of this patent may be obtained for five cents each, by addressing the "Commissioner of Patents, Washington, D. C."